United States Patent
Nakagawa

(10) Patent No.: US 9,740,185 B2
(45) Date of Patent: Aug. 22, 2017

(54) PERIPHERAL DEVICE FOR PROGRAMMABLE CONTROLLER AND DEBUG SUPPORT PROGRAM

(71) Applicant: Mitsubishi Electric Corporation, Tokyo (JP)

(72) Inventor: Jun Nakagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/781,399

(22) PCT Filed: Apr. 12, 2013

(86) PCT No.: PCT/JP2013/061112
§ 371 (c)(1),
(2) Date: Sep. 30, 2015

(87) PCT Pub. No.: WO2014/167726
PCT Pub. Date: Oct. 16, 2014

(65) Prior Publication Data
US 2016/0033953 A1     Feb. 4, 2016

(51) Int. Cl.
*G06F 9/44*    (2006.01)
*G05B 19/042*  (2006.01)
(Continued)

(52) U.S. Cl.
CPC ......... *G05B 19/0426* (2013.01); *G05B 19/05* (2013.01); *G06F 11/36* (2013.01); *G05B 2219/23445* (2013.01)

(58) Field of Classification Search
CPC ........................................................ G06F 9/44
(Continued)

(56) References Cited

U.S. PATENT DOCUMENTS 5,113,359 A * 5/1992 Kiya ................... G05B 19/058
                                                               700/18
5,175,697 A * 12/1992 Kawagoe .................. G01J 3/28
                                                              356/320

(Continued)

FOREIGN PATENT DOCUMENTS

JP       01-251206 A     10/1989
JP       03-161803 A      7/1991
(Continued)

OTHER PUBLICATIONS

Taiwanese Office Action "Examination Report From the Intellectual Property Office" for TW 102138634 dated Jul. 14, 2015 (corresponding to PCT/JP2013/061112).

(Continued)

*Primary Examiner* — Jae Jeon
(74) *Attorney, Agent, or Firm* — Sughrue Mion, PLLC; Richard C. Turner

(57) ABSTRACT

A peripheral device for a programmable controller includes a display unit; a program storage unit; a history information storage unit storing history information that is arithmetic processing information during execution of the user program in the programmable controller and recorded under a predetermined condition; a program display processing unit displaying a designated user program in a user program display area; a trend graph display processing unit displaying a first trend graph obtained by graphing first history information corresponding to the designated user program and a cursor indicating a position on the first trend graph, in a trend graph display area; and a cursor information acquisition unit acquiring a cursor position and acquiring arithmetic processing information corresponding to the cursor position from the first history information, wherein the program display processing unit displays the arithmetic (Continued)

processing information over the user program in the user program display area.

6 Claims, 12 Drawing Sheets

(51) Int. Cl.
 *G06F 11/36* (2006.01)
 *G05B 19/05* (2006.01)
(58) Field of Classification Search
 USPC .................. 717/124–128, 131, 134, 135
 See application file for complete search history.

(56) References Cited

U.S. PATENT DOCUMENTS

| | | | |
|---|---|---|---|
| 6,810,477 B1 * | 10/2004 | Miyabe ................. | G05B 19/05 712/245 |
| 7,072,863 B1 * | 7/2006 | Phillips ................. | G06Q 40/00 703/2 |
| 2009/0177722 A1 * | 7/2009 | Midorogi ............... | G06F 15/02 708/130 |
| 2011/0137435 A1 | 6/2011 | Furusawa | |
| 2013/0124184 A1 | 5/2013 | Sakaguchi et al. | |
| 2014/0058538 A1 * | 2/2014 | Yaoita ................. | G06F 11/3636 700/28 |

FOREIGN PATENT DOCUMENTS

| | | |
|---|---|---|
| JP | 04-177402 A | 6/1992 |
| JP | 04-284504 A | 10/1992 |
| JP | 04-302001 A | 10/1992 |
| JP | 04-370806 A | 12/1992 |
| JP | 05-092804 A | 4/1993 |
| JP | 2653346 B2 | 9/1997 |
| JP | 10-011116 A | 1/1998 |
| JP | 2000-222012 A | 8/2000 |
| JP | 2002-163020 A | 6/2002 |
| JP | 2002163020 A * | 6/2002 |
| JP | 2003-157113 A | 5/2003 |
| JP | 2005-115426 A | 4/2005 |
| JP | 2010-160540 A | 7/2010 |
| JP | 2010-238232 A | 10/2010 |
| JP | 2011-118658 A | 6/2011 |
| JP | 2011-192016 A | 9/2011 |
| JP | 2012-064033 A | 3/2012 |
| JP | 2012064033 A * | 3/2012 |
| JP | 2012-194680 A | 10/2012 |

OTHER PUBLICATIONS

Japanese Office Action for JP 2013-556088 dated Jan. 29, 2014 (corresponding to PCT/JP2013/061112).
International Search Report of PCT/JP2013/061112 dated Jun. 25, 2013 [PCT/ISA/210].
Communication dated Jul. 25, 2016 from the German Patent and Trademark Office in counterpart application No. 112013006837.0.
Lauterbach GmbH, "Trace 32 In-Circuit Debugger: Quick Installation and Tutorial," (Aug. 1998) 89 pages total.
Lauterbach GmbH, "Advanced Debug with Powerintegrator," (Jun. 2012) 17 pages total.
Communication dated Jan. 6, 2017, mailed by the Korean Intellectual Property Office in corresponding Korean Application No. 10-2015-7032187.

* cited by examiner

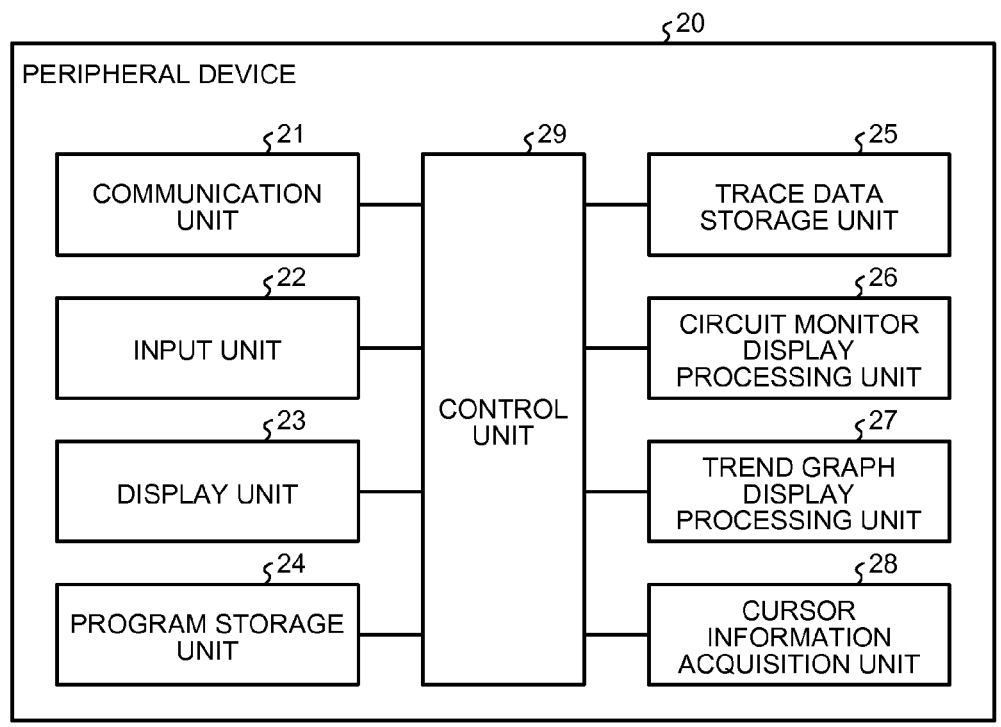

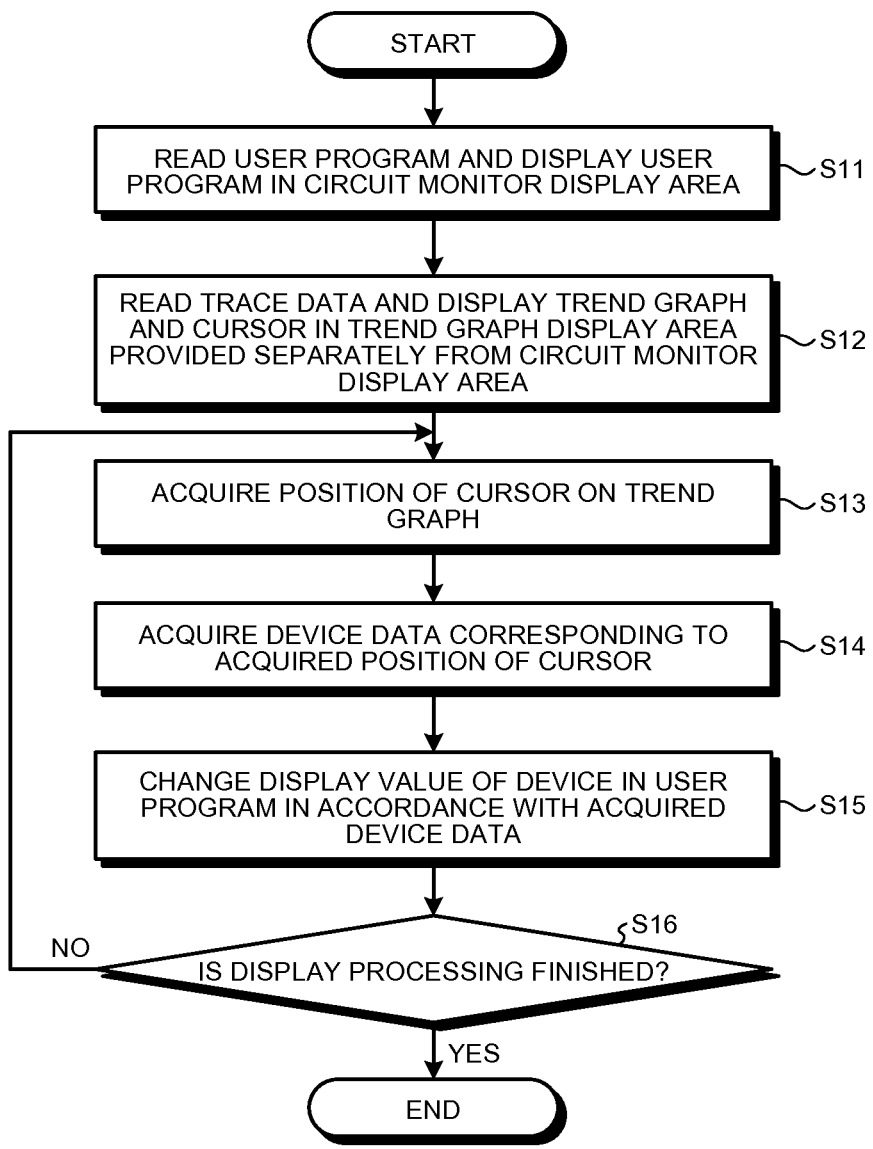

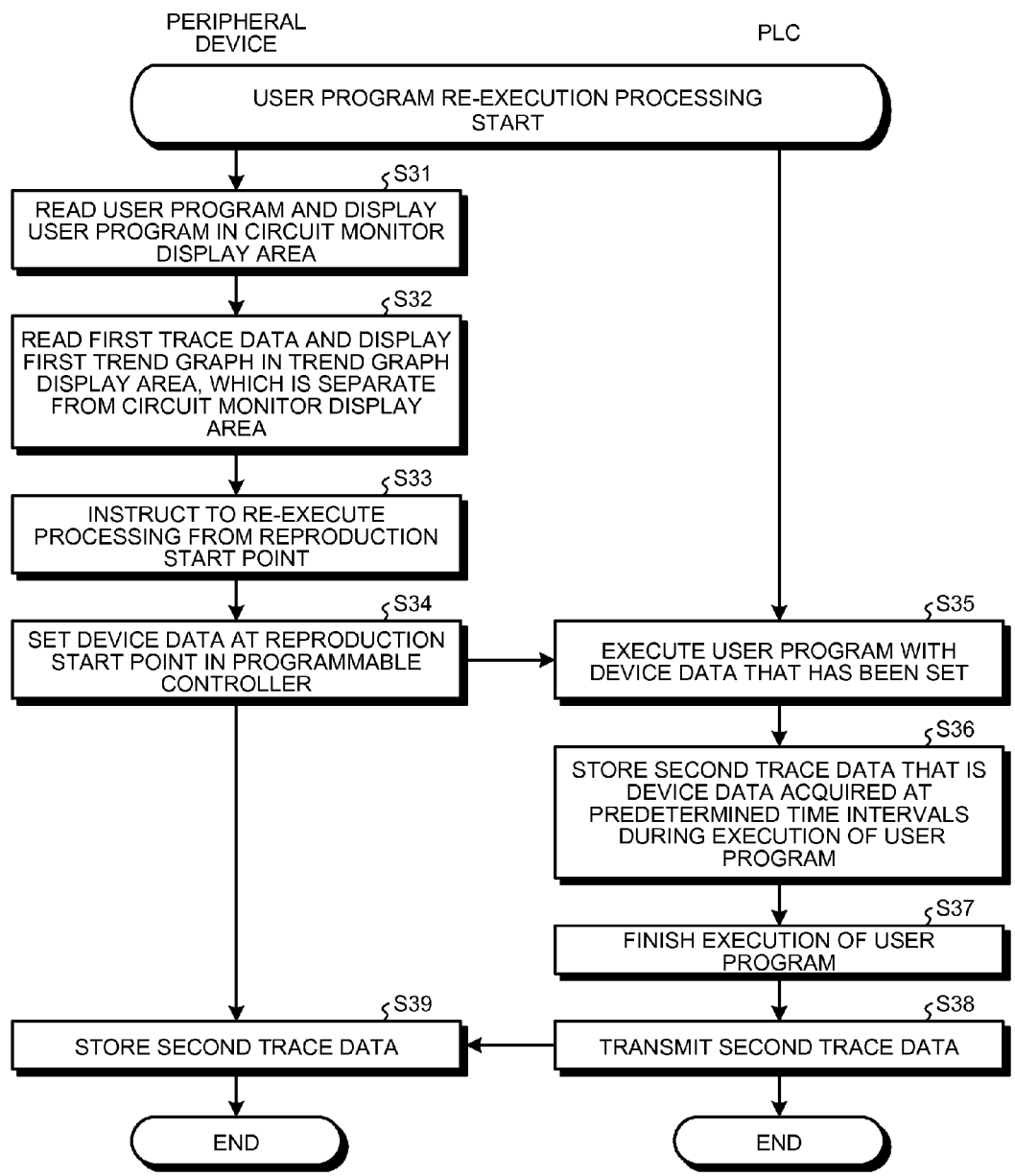

TREND GRAPH
(TRACE DATA)

TIMING CHART OF
EXTERNAL INPUT

PERIPHERAL DEVICE FOR PROGRAMMABLE CONTROLLER AND DEBUG SUPPORT PROGRAM

CROSS REFERENCE TO RELATED APPLICATIONS

This application is a National Stage of International Application No. PCT/JP2013/061112, filed Apr. 12, 2013, the contents of which are incorporated herein by reference in its entirety.

FIELD

The present invention relates to a peripheral device for a programmable controller and a debug support program.

BACKGROUND

Programmable controllers control devices on the basis of programs and parameter files that define various parameters. For such programmable controllers, a conventional technique has been proposed in which a monitor displays, in its upper half, a program in the format of a ladder diagram and, in its lower half, a trend graph (time chart) representing chronologically the states (device data) of input/output devices registered by the user (for example, see Patent Literature 1).

CITATION LIST

Patent Literature

Patent Literature 1: Japanese Patent No. 2653346

SUMMARY

Technical Problem

When an abnormality occurs in a programmable controller, program correction work (debugging) is conducted to locate and eliminate the abnormality. The technique described in Patent Literature 1 allows the monitor to display a program and a trend graph such that a chronological change in the data can be checked, but it fails to display the state of the program at a designated given time. Thus, the user is required to read data on the trend graph by himself/herself to see which part of the program is associated with the data and trace the operation of the program. This results in a problem in that it takes time to determine the factors of the abnormal state.

The present invention has been achieved in view of the above and an object of the present invention is to provide a peripheral device for a programmable controller and a debug support program that can facilitate determining the operating state of a program at a given time by using a trend graph.

Solution to Problem

In order to achieve the above object, a peripheral device for a programmable controller according to an aspect of the present invention includes a display unit; a program storage unit that stores a user program to be executed in the programmable controller; a history information storage unit that stores history information that is arithmetic processing information during execution of the user program in the programmable controller and recorded under a predetermined condition; a program display processing unit that displays a designated user program in a user program display area provided in the display unit; a trend graph display processing unit that displays a first trend graph and a cursor in a trend graph display area provided separately from the user program display area in the display unit, the first trend graph being obtained by graphing first history information that corresponds to the designated user program, the cursor indicating a position on the first trend graph; and a cursor information acquisition unit that acquires a position of the cursor on the first trend graph and acquires arithmetic processing information corresponding to the position of the cursor from the first history information, wherein the program display processing unit displays the arithmetic processing information acquired from the cursor information acquisition unit over the user program in the user program display area.

Advantageous Effects of Invention

The present invention produces an effect of enabling acquisition, as trace data that is history information, of the state in a data memory before and after the occurrence of an abnormality in a programmable controller, displaying of the trace data in the form of a trend graph together with a user program on a peripheral device, and displaying of the state of device data at a given timing designated on the trend graph on the user program. This results in an effect of facilitating the determination of the operating state of the program at a given time by using the trend graph.

BRIEF DESCRIPTION OF DRAWINGS

FIG. 1 is a schematic block diagram illustrating an exemplary functional configuration of a peripheral device for a programmable controller according to a first embodiment.

FIG. 2 is a diagram illustrating example trace data.

FIG. 6 is a flowchart illustrating an exemplary procedure of a debug support method of the peripheral device according to the first embodiment.

FIG. 8 is a flowchart illustrating an exemplary procedure of user program re-execution processing according to the second embodiment.

DESCRIPTION OF EMBODIMENTS

Figure 3A:
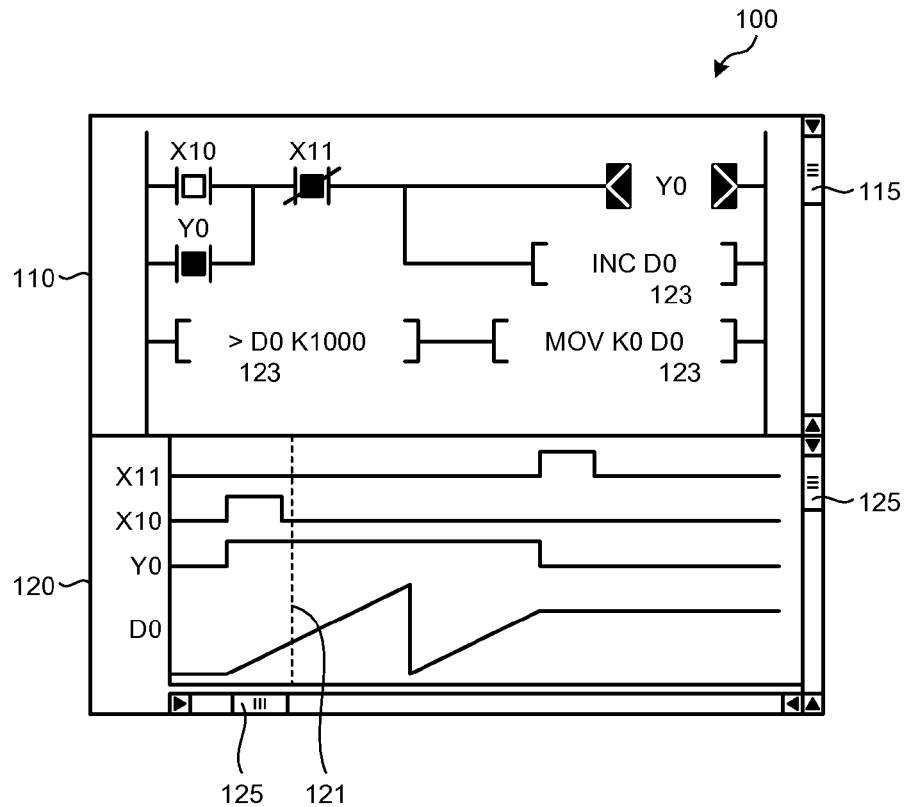
FIGS. 3(a) and 3(b) are diagrams illustrating an example display screen according to the first embodiment.

Exemplary embodiments of a peripheral device for a programmable controller and a debug support program according to the present invention will be described in detail with reference to the accompanying drawings. The present invention is not limited to the embodiments.

First Embodiment

A case will be described below in which information sampled by a programmable controller is displayed on a peripheral device. First, a programmable controller will be described. A programmable controller is an apparatus that accommodates device data therein and, for example, acquires the state of an input device connected to the programmable controller, such as a relay, a switch, and a sensor, and controls an output device, such as an actuator and a valve, by reading/writing the device data according to a user program (sequence program) created by the user. Additionally, a programmable controller used in the embodiments below has a sampling function to retain, in a memory, device data that is arithmetic processing information set in advance at a predetermined timing or trace data that is history information obtained by collecting all device data for a set time period. The device data is collected at a predetermined timing, such as when a command is executed, when an error occurs, and when a command from a peripheral device or a condition that has been set becomes true.

FIG. 1 is a schematic block diagram illustrating an exemplary functional configuration of a peripheral device for a programmable controller according to a first embodiment. A peripheral device 20 for a programmable controller includes a communication unit 21, an input unit 22, which is an editing unit, a display unit 23, which is a display unit, a program storage unit 24, which is a program storage unit, a trace data storage unit 25, which is a history information storage unit, a circuit monitor display processing unit 26, which is a program display processing unit, a trend graph display processing unit 27, which is a trend graph display processing unit, a cursor information acquisition unit 28, which is a cursor information acquisition unit, and a control unit 29, which controls these processing units.

The communication unit 21 communicates with an undepicted programmable controller. The input unit 22 is an input interface with the user, such as a keyboard or a pointing device. Through the input unit 22, a user program to be executed in the programmable controller is created, the user program is debugged, and an instruction to move a cursor displayed on a trend graph, which will be described hereinafter, is input. The display unit 23 is a device that displays information for a user, such as a liquid crystal display.

The program storage unit 24 stores a user program to be executed in the programmable controller. The user program is created by the user through, for example, the input unit 22 and, then, installed through the communication unit 21 into the programmable controller.

The trace data storage unit 25 stores trace data sampled by the programmable controller. The trace data may be associated with the executed user program when stored. FIG. 2 is a diagram illustrating example trace data. The trace data is data obtained by storing, for each index that corresponds to sampling unit time, a collection time and values of the device data retained in a device data memory unit of the programmable controller. The device data is arithmetic processing information indicative of a value acquired from an input device connected to the programmable controller or of a value output to an output device connected to the programmable controller. Here, "X" represents bit data indicative of an input signal, "Y" represents bit data indicative of an output signal, and "D" represents word data indicative of a numeric value. Note that the trace data is not limited to that collected by the programmable controller and stored through the communication unit 21. For example, the peripheral device 20 may collect the device data in the programmable controller at different times through the communication unit 21 and store the device data that has been collected in a predetermined time period in the trace data storage unit 25 as the trace data.

When instructed by the user to, for example, execute a cause determination processing mode at the occurrence of an abnormality in the user program, the circuit monitor display processing unit 26 performs processing to display, in a circuit monitor display area of the display unit 23, the user program that is in the program storage unit 24 and selected by the user. A user program used in a programmable controller is in general a sequence program. The sequence program is written in a relay symbolic language that is based on the concept of a relay control circuit. Since a sequence program is written in the format of a circuit diagram as described above, a displayed sequence program is also referred to as a circuit. Because of this, an area that displays a user program is referred to as the circuit monitor display area in the embodiments below.

When instructed by the user to execute the cause determination processing mode, the trend graph display processing unit 27 performs processing to plot trace data that corresponds to the program selected by the user and is in the trace data storage unit 25 as a trend graph and to display the trend graph in a trend graph display area of the display unit 23. The trend graph display area is provided in the display unit 23 as a separate area from the circuit monitor display area.

FIG. 3 is a diagram illustrating an example display screen according to the first embodiment. In FIG. 3(a), a display screen 100 includes, in its upper half, a circuit monitor display area 110 that displays a user program and, in its lower half, a trend graph display area 120 that displays a trend graph. Since a sequence program typically includes commands of many rows (for example, hundreds of rows or thousands of rows), an entire user program cannot be displayed in the circuit monitor display area 110. Hence, a scroll bar 115 is provided in the circuit monitor display area 110; therefore, the user program can be scrolled and viewed in its entirety. The trend graph display area 120 similarly includes a scroll bar 125. In the trend graph display area 120, a cursor 121 that designates a time on a trend graph is displayed over the trend graph. Here, the cursor 121 refers to a vertical line operable along the direction of (corresponding to) the time axis on the trend graph and is used to indicate the position (index), on the trace data, of the device data displayed on the circuit monitor. While the cursor 121 is displayed with a dotted line in FIG. 3, it may be displayed with a straight line such as a solid line or a dashed line and it may blink when displayed. The circuit monitor display area 110 and the trend graph display area 120 may be each configured with one window.

Figure 3B:
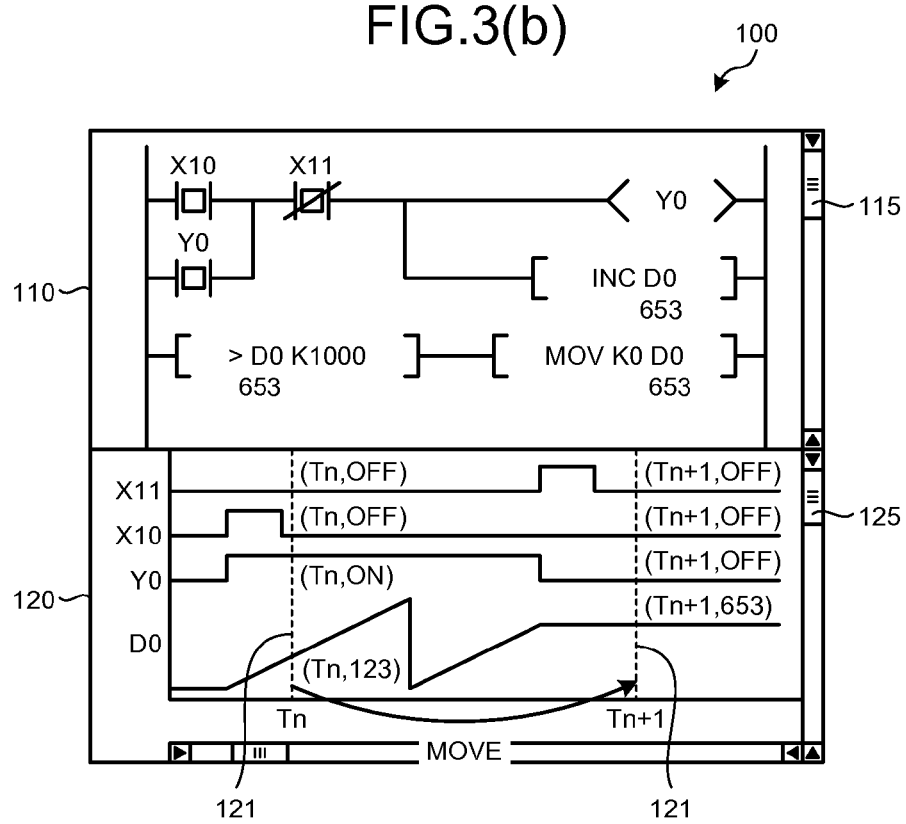

As illustrated in FIG. 3(b), values of a contact point between the cursor 121 and each graph may be displayed in the trend graph display area 120. The position of the cursor 121 and a value of each piece of the device data acquired from the cursor information acquisition unit 28, which will be described hereinafter, can be used as the values of a contact point between the cursor and each graph. Such a display screen can further facilitate determining the state at the position indicated by the cursor 121 in the trend graph display area 120.

Figure 4:
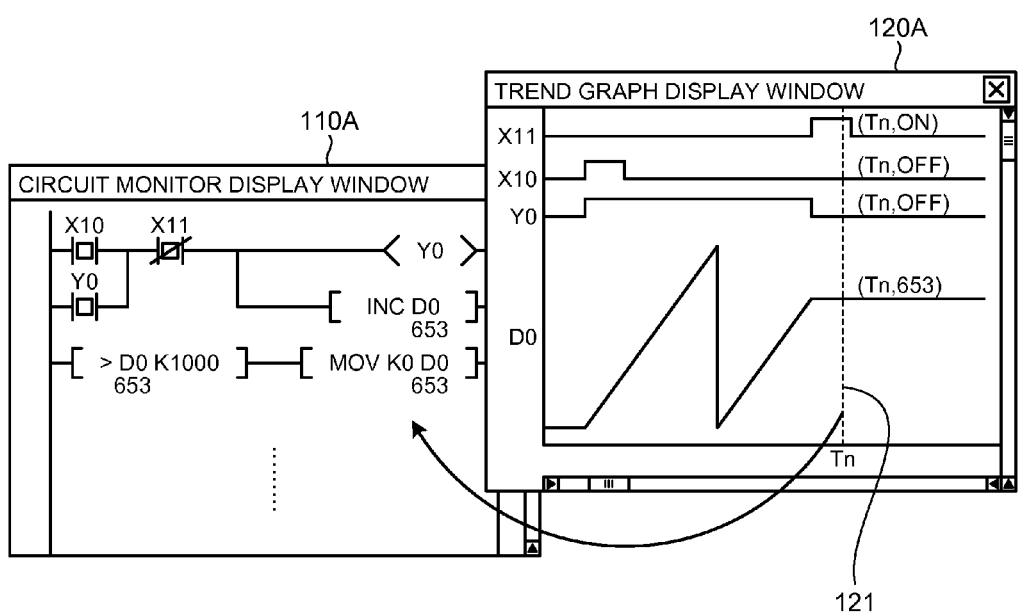
FIG. 4 is a diagram illustrating an example display screen according to the first embodiment.

While merely one circuit monitor display is available in the example illustrated in FIG. 3, the screen may be split to display given parts of circuits of a plurality of programs simultaneously. Alternatively, different programs may be switched to be displayed in one screen. Alternatively, a screen (window) to display a circuit monitor and a screen (window) to display a trend graph may be provided separately. FIG. 4 is a diagram illustrating an example display screen according to the first embodiment. In this case, a value of a device on a circuit monitor display may be also displayed on the circuit monitor display screen in conjunction with the movement of the cursor 121 on a trend graph in a trend graph display screen.

The cursor information acquisition unit 28 acquires the position of the cursor 121 provided in the trend graph display area 120. Specifically, the cursor information acquisition unit 28 acquires the position (index) of the cursor 121 on the trend graph and acquires device data corresponding to the index from the trace data storage unit 25. The cursor information acquisition unit 28 then passes the acquired device data as cursor designation information to the circuit monitor display processing unit 26.

In the first embodiment, to cause a trend graph in the trend graph display area 120 and a user program in the circuit monitor display area 110 to be associated with each other, the cursor information acquisition unit 28 described above is provided, such that the cursor designation information acquired by the cursor information acquisition unit 28 is displayed in the circuit monitor display area 110 by the circuit monitor display processing unit 26.

Specifically, the circuit monitor display processing unit 26 has a function to display a value of each piece of the device data located at the position of the cursor 121 in the trend graph display area 120, over or in proximity to the corresponding position located in the user program in the circuit monitor display area 110. For example, a bit device that is on is highlighted and a value of the word data is displayed in proximity to the position of a word device, on the basis of the cursor designation information acquired from the cursor information acquisition unit 28.

Figure 5A:
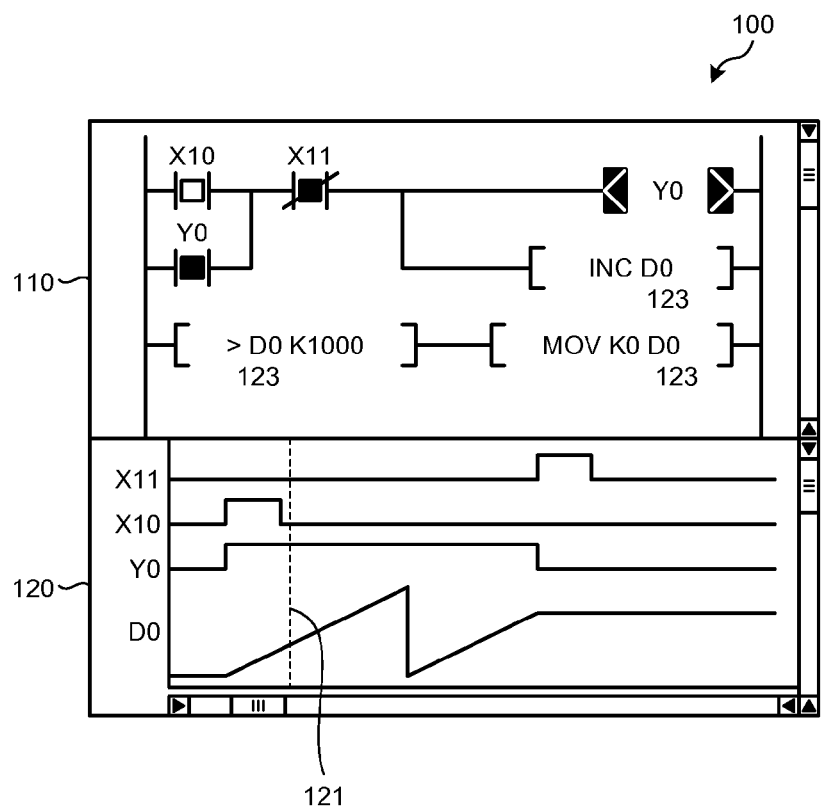
FIGS. 5(a) and 5(b) are diagrams illustrating an example displaying state of a user program and a trend graph according to the first embodiment.

FIG. 5 is a diagram illustrating an example displaying state of a user program and a trend graph according to the first embodiment. In the trend graph display area 120 illustrated in FIG. 5(a), the cursor 121 is at the position of a time Tn, bit devices (X11, Y0), which are in a conductive state at this point, are indicated in black in the circuit monitor display area 110, and a value ("123" in this example) of a word device (D0) at this point is displayed in proximity to the word device.

Figure 5B:
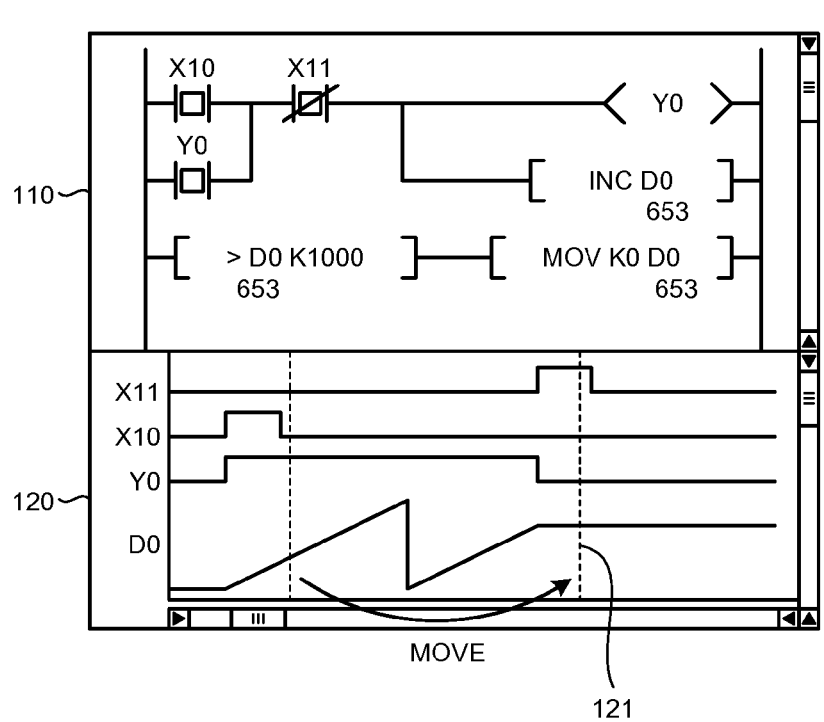

In a trend graph illustrated in FIG. 5(b), the cursor 121 is at the position of a time Tn+1, a bit device in a conductive state at this point is indicated in black in the circuit monitor display area 110, and a value ("653" in this example) of the word device (D0) at this point is displayed in proximity to the word device. Since there is no bit device in a conductive state in this example (there are only bit devices not in a conductive state), there is no device indicated in black in the circuit monitor display area 110.

A debug support method of the peripheral device 20, which has the configuration described above, for a programmable controller will now be described. FIG. 6 is a flowchart illustrating an exemplary procedure of a debug support method of the peripheral device according to the first embodiment. It is assumed here that trace data is already stored in the trace data storage unit 25 of the peripheral device 20.

When the user selects through the input unit 22 a user program that the user wishes to analyze, the circuit monitor display processing unit 26 reads the selected user program from the program storage unit 24. The circuit monitor display processing unit 26 then displays the user program in the circuit monitor display area 110 of the display unit 23 (step S11).

The trend graph display processing unit 27 reads the selected trace data from the trace data storage unit 25. The trend graph display processing unit 27 then displays a trend graph, which is obtained by graphing the trace data, and the cursor 121 in the trend graph display area 120 of the display unit 23 (step S12). The trend graph has a horizontal axis that represents the elapsed time. This provides a configuration that enables the cursor 121 to move along the time axis direction.

Subsequently, the cursor 121 in the trend graph display area 120 is moved by the user through the input unit 22. At this point in time, the cursor information acquisition unit 28 acquires the position of the moved cursor 121 on the trend graph (step S13). In this example, the position on the trend graph is an index in the trace data. Additionally, the cursor information acquisition unit 28 acquires the device data at the position on the trend graph from the trace data in the trace data storage unit 25 (step S14) and passes the acquired device data to the circuit monitor display processing unit 26.

The circuit monitor display processing unit 26 changes the display of the value of the device in the user program in the circuit monitor display area 110, in accordance with the acquired device data (step S15). In the case of, for example, the device data indicative of the on-state, the circuit monitor display processing unit 26 changes the display by highlighting the corresponding device or displaying the device in a different color. In the case of the device data being word data indicative of a numeric value, the circuit monitor display processing unit 26 displays the numeric value in proximity to the corresponding device.

Subsequently, it is determined whether the display processing is finished according to, for example, an instruction from the user through the input unit 22 (step S16). If the display processing is not finished (No in step S16), the flowchart returns to step S13. If the display processing is finished (Yes in step S16), the flowchart is finished.

While the cursor 121 is moved by the user in the example described above, this is not a limitation. For example, while the cursor 121 is automatically moved in the chronological order, the value of a device in the circuit monitor display may be changed in succession.

The first embodiment enables the arithmetic processing information on a user program before and after the occurrence of an abnormality in a programmable controller to be displayed over the displayed user program and thus facilitates determining the operating state of the user program at the occurrence of the abnormality. This results in facilitation of locating the abnormality of the user program; therefore, an effect is obtained where debugging work on the user program can be performed efficiently.

Second Embodiment

In the first embodiment, a case has been described in which a trend graph, which is based on trace data resulting from the execution of a user program by a programmable controller, and the user program are displayed on separate screens, and changes in value of a device in the user program can be viewed with the corresponding positions of the cursor on the trend graph. In a second embodiment, a case will be described in which a given time on the trend graph is designated, the device data at the designated time is set in the programmable controller to re-execute the user program, and the result is compared to the initial trend graph.

Figure 7:
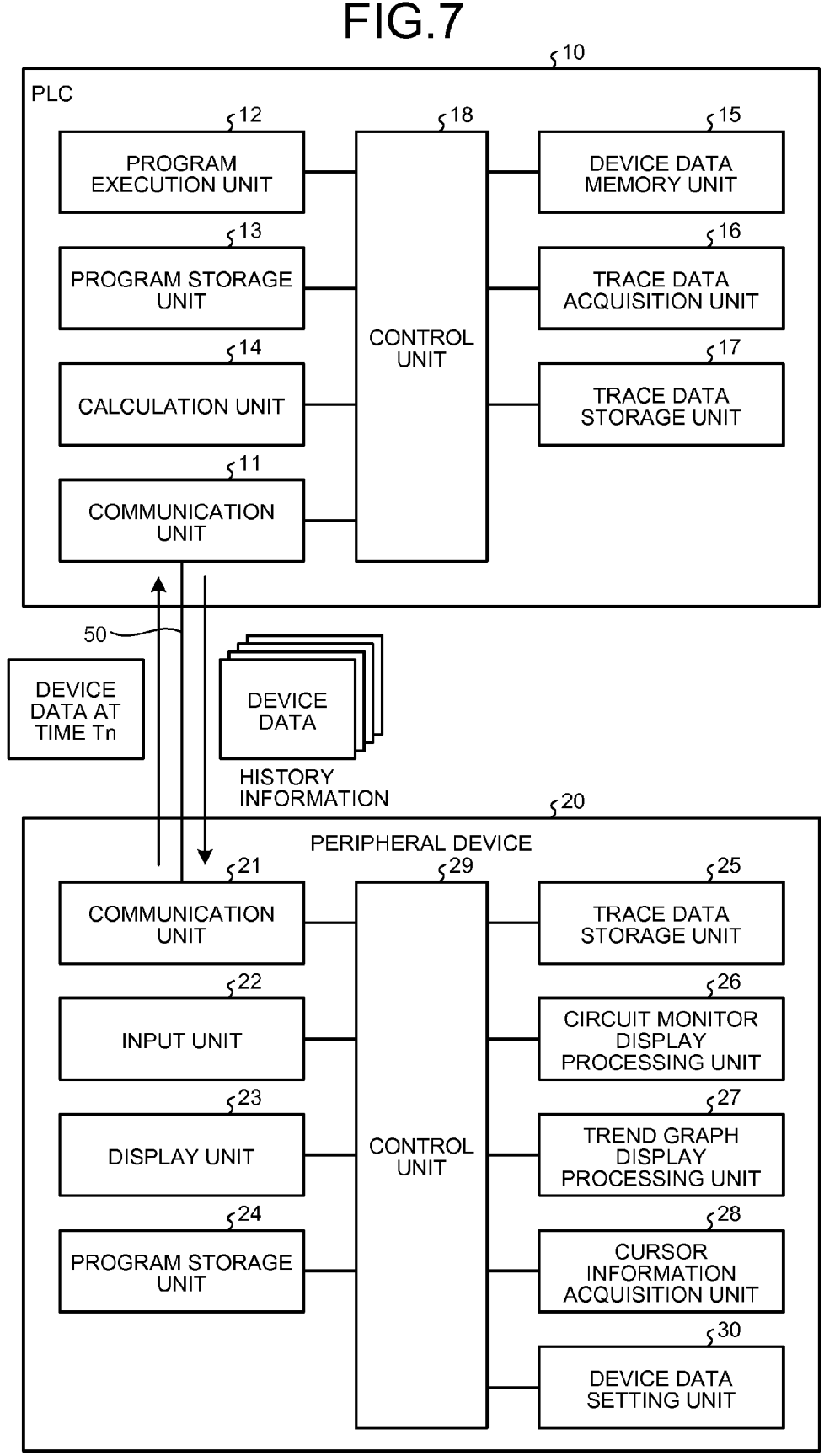
FIG. 7 is a schematic block diagram illustrating an exemplary functional configuration of a programmable controller system according to a second embodiment.

FIG. 7 is a schematic block diagram illustrating an exemplary functional configuration of a programmable controller system according to the second embodiment. The programmable controller system has a configuration including a programmable controller (referred to as PLC in the FIG. 10 and the peripheral device 20 mutually connected through a network 50.

The programmable controller 10 includes a communication unit 11, a program execution unit 12, a program storage unit 13, a calculation unit 14, a device data memory unit 15, a trace data acquisition unit 16, a trace data storage unit 17, and a control unit 18, which controls these processing units.

The communication unit 11 communicates with the peripheral device 20. The program storage unit 13 stores a user program to be executed in the programmable controller 10. The program execution unit 12 executes the user program stored in the program storage unit 13. The calculation unit 14 executes arithmetic processing when an arithmetic processing command is read during the execution of the user program by the program execution unit 12. The device data memory unit 15 retains values for use in calculation by the calculation unit 14 and retains the result of calculation by the calculation unit 14. Values for use in calculation are information indicative of the state of an input device, and the result of calculation is information for controlling an output device. The values for use in calculation and the result of calculation correspond to the device data.

The trace data acquisition unit 16 acquires the device data retained in the device data memory unit 15 at predetermined time intervals, every time the program is executed once (one scan), every time a command is executed, or when a predetermined condition is satisfied, and stores, in the trace data storage unit 17, trace data in which the acquired device data is arranged in chronological order. The trace data storage unit 17 stores the trace data, which is the device data arranged chronologically.

In addition to the components in the first embodiment, the peripheral device 20 further includes a device data setting unit 30, which is a parameter setting unit. The device data setting unit 30 acquires, from the trace data storage unit 25, device data at a certain time (index) set by the user through the input unit 22 and sets the device data in the programmable controller 10 through the communication unit 21 and the communication unit 11. Note that components identical with those in the first embodiment are designated with identical reference signs and their description will be omitted.

Operation processing in the programmable controller system having the configuration described above will now be described for (1) user program re-execution processing and (2) debug support processing after the user program re-execution processing.

(1) User Program Re-Execution Processing

FIG. 8 is a flowchart illustrating an exemplary procedure of the user program re-execution processing according to the second embodiment. FIG. 9 is a schematic diagram illustrating an example display screen for the user program re-execution processing according to the second embodiment. First, the circuit monitor display processing unit 26 of the peripheral device 20 reads a user program that is in the program storage unit 24 and designated by the user and displays the user program in the circuit monitor display area 110 of the display unit 23 (step S31). The trend graph display processing unit 27 reads designated first trace data in the trace data storage unit 25 and displays a first trend graph, which is obtained by graphing the first trace data, and the cursor 121, which allows selection of a position on the first trend graph, in the trend graph display area 120, which is separate from the circuit monitor display area 110 (step S32). The first trace data is an aggregate of device data obtained as a result of the execution of the user program by the programmable controller 10.

Figure 9A:
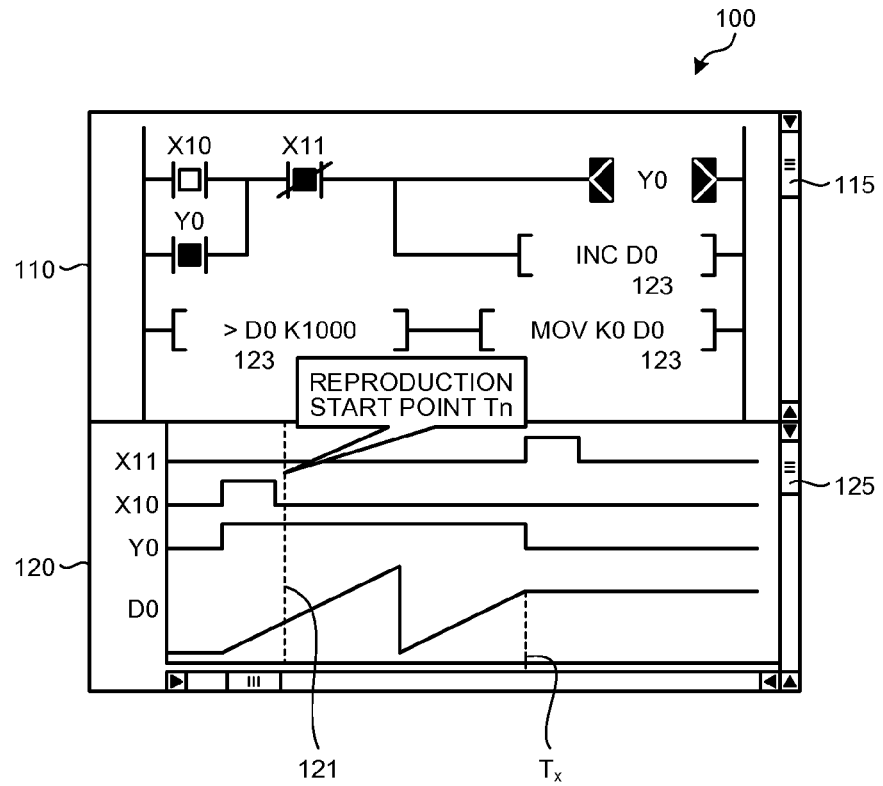
FIGS. 9(a) and 9(b) are schematic diagrams illustrating an example display screen for the user program re-execution processing according to the second embodiment.

Through the processing described above, the display screen 100 as illustrated in, for example, FIG. 9(a) is obtained. Here, it is assumed that the user checks the display screen 100 and finds a part that does not, for example, operate according to the user program. It is also assumed that, to reconfirm the part, the user wishes to reproduce the execution of the user program from, for example, a time Tn. Therefore, the user moves the cursor 121 to this position (a reproduction start point) and provides an instruction, through the input unit 22, for the programmable controller 10 to re-execute the processing from the cursor position (step S33).

The device data setting unit 30 of the peripheral device 20 acquires the device data at the indicated cursor position from the trace data in the trace data storage unit 25 and sets the device data in the programmable controller 10 through the communication units 21 and 11 (step S34). The device data is set in the device data memory unit 15 of the programmable controller 10. Here, the device data may be for setting all the values prescribed in the user program or for setting a part of the values.

The programmable controller 10 performs execution processing on the user program with the device data set in the device data memory unit 15 (step S35). Meanwhile, the trace data acquisition unit 16 of the programmable controller 10 acquires, at predetermined time intervals, device data that is retained in the device data memory unit 15 during the execution of the user program and stores the device data as second trace data in the trace data storage unit 17 (step S36).

When the execution processing of the user program is finished (step S37) at the timing when a command from the peripheral device or a set condition becomes true, the programmable controller 10 transmits the second trace data in the trace data storage unit 17 to the peripheral device (step S38), and the peripheral device 20 stores the second trace data from the programmable controller 10 in the trace data storage unit 25 (step S39). In steps S38 to S39, the peripheral device 20 may collect the device data and create the trace data. With the processing described above, the user program re-execution processing is finished.

(2) Debug Support Processing after User Program Re-Execution Processing

Figure 9B:
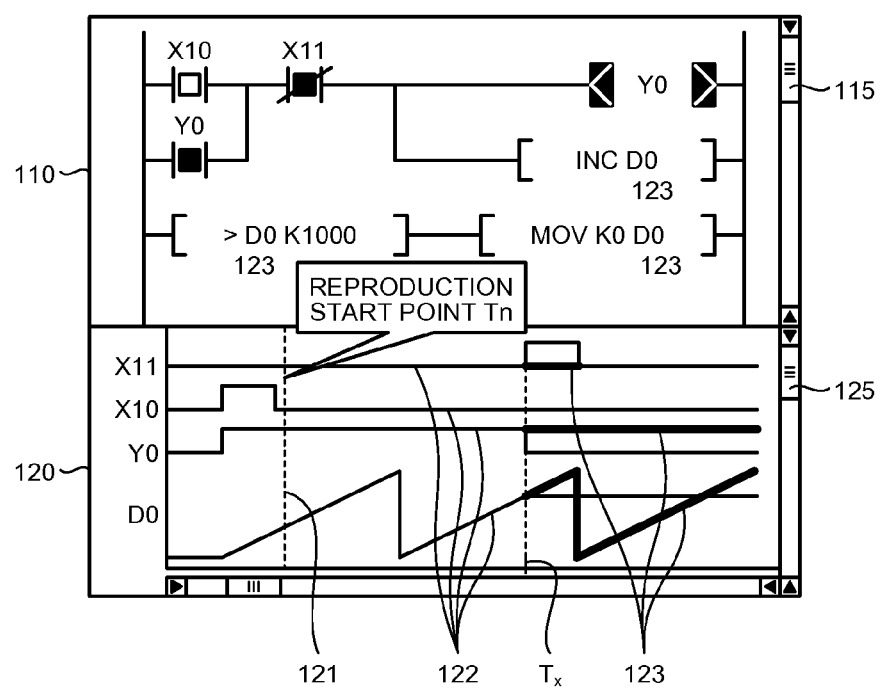
Figure 10:
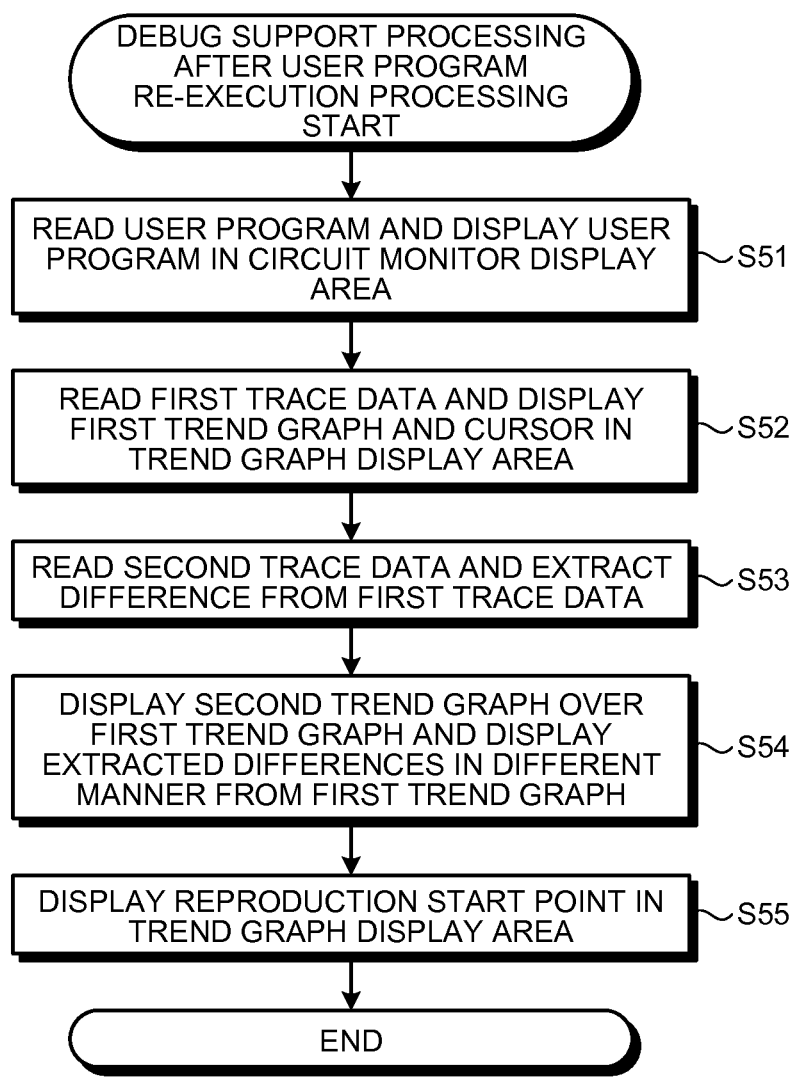
FIG. 10 is a flowchart illustrating an exemplary procedure of debug support processing after the user program re-execution processing according to the second embodiment.

FIG. 10 is a flowchart illustrating an exemplary procedure of the debug support processing after the user program re-execution processing according to the second embodiment. The description below references FIG. 9(b). The circuit monitor display processing unit 26 of the peripheral device 20 reads the selected user program from the program storage unit 24. The circuit monitor display processing unit 26 then displays the user program in the circuit monitor display area 110 of the display unit 23 (step S51).

The trend graph display processing unit 27 reads the selected first trace data from the trace data storage unit 25. The trend graph display processing unit 27 then displays a first trend graph 122, which is obtained by graphing the first trace data, and the cursor 121 in the trend graph display area 120 of the display unit 23 (step S52). The first trace data is an aggregate of the device data before the user program re-execution processing.

Then, the trend graph display processing unit 27 reads the second trace data, which is obtained after the re-execution of the selected user program, from the trace data storage unit 25. The trend graph display processing unit 27 extracts a difference from the first trace data (step S53).

Subsequently, the trend graph display processing unit 27 displays a second trend graph, which is obtained by graphing the second trace data, over the first trend graph 122 in the trend graph display area 120 with the reproduction start point (the position corresponding to the time Tn) as the base point and also displays extracted differences 123 in a manner different from that of the first trend graph 122 (step S54). Additionally, the trend graph display processing unit 27 displays the reproduction start point designated in step S33 of the user program re-execution processing in the trend graph display area 120 (step S55) to finish the debug support processing.

Through the processing described above, the display screen 100 as illustrated in FIG. 9(b) is displayed in the display unit 23. In the trend graph display area 120 in FIG. 9(b), the differences 123 between the second trend graph and the first trend graph 122 are highlighted.

In FIG. 9(b), the first trend graph 122 includes the word data D0 that has a constant value from a time Tx, whereas the second trend graph includes the word data D0 the value of which increases from the time Tx until it is reset at a predetermined value and starts increasing again, as indicated in the differences 123. In this example, it is assumed that the second trend graph indicates the correct behaviors.

The user performs analysis for a cause generated in the programmable controller 10 while viewing the display screen 100 illustrated in FIG. 9(b). In this example, while the first trend graph 122 indicates that a trouble has occurred at the time Tx, the second trend graph indicates no such trouble. In such a case, it is possible to determine that the trouble is likely to have been caused by noise, a misoperation of a switch, or the like. Additionally, the second trend graph indicates that X11 remains off and thus Y0 remains on at the time Tx. Conversely, the first trend graph 122 indicates that X11 is turned on and thus Y0 is turned off at the time Tx. Because X is a switch, it is possible to consider that, for example, the operator may have pressed the switch X11 by mistake.

If, however, the second trend graph is identical with the first trend graph 122 and the user program re-execution processing to be performed subsequently also produces identical trend graph, it is possible to determine that there is abnormality with the user program.

In the second embodiment, a given time on the first trend graph 122 is designated, and the device data at the designated time is fetched. The device data is written in the device data memory unit 15 of the programmable controller 10, and the user program is re-executed to reproduce the operation of the programmable controller 10. Additionally, during the reproduction, the second trace data is collected and transmitted to the peripheral device 20, and the second trend graph is displayed over the first trend graph 122. Thus, the programmable controller 10 can be returned to the state immediately before the occurrence of an abnormality; therefore, the user program can be re-executed. Accordingly, it is possible to conduct a reproduction test of the occurrence of the abnormality easily by using trend graphs. As a result, an effect is produced of facilitating the reproduction of occurrence of an abnormality and the verification of the operation of the user program at the occurrence of the abnormality.

Third Embodiment

In the second embodiment, the device data is written in the programmable controller, and the programmable controller is returned, for example, to the state immediately before the occurrence of an abnormality to reproduce the operation. In a third embodiment, a case will be described in which the operation of a programmable controller is reproduced in simulation.

Figure 11:
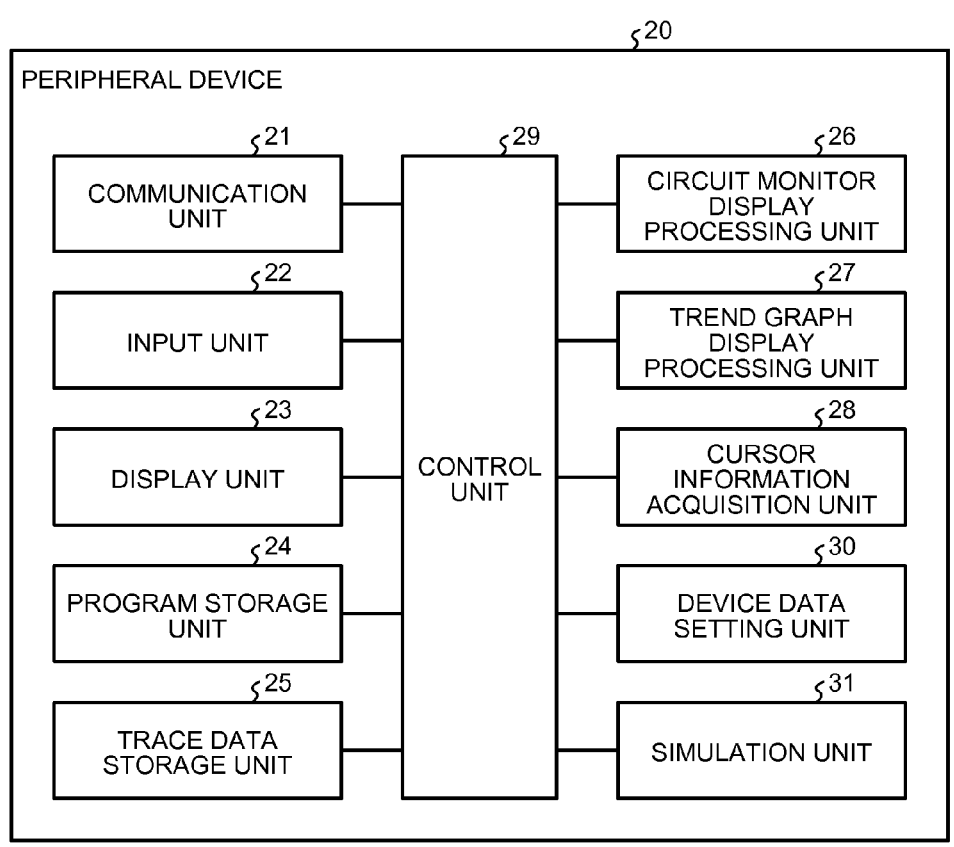
FIG. 11 is a schematic block diagram illustrating an exemplary functional configuration of a peripheral device according to a third embodiment.

FIG. 11 is a schematic block diagram illustrating an exemplary functional configuration of a peripheral device according to the third embodiment. The peripheral device 20 further includes a simulation unit 31, which is a simulation unit, in addition to the components in the second embodiment. The simulation unit 31 simulates the execution of a user program in a programmable controller by using device data set in the device data setting unit 30. The simulation unit 31 performs simulation processing on the basis of the configuration and the specifications prescribed in advance of the programmable controller that executes the user program. A publicly known simulator can be used as the simulation unit 31.

While the device data setting unit 30 in the second embodiment sets user data designated by the user in the device data memory unit 15 of the programmable controller 10, the device data setting unit 30 in the third embodiment has a function to pass the user data to the simulation unit 31. Note that components identical with those in the first and second embodiments are designated with identical reference signs and their description will be omitted.

The operation in the third embodiment is substantially similar to the second embodiment and its description will be omitted. Note that the third embodiment is different from the second embodiment in that the re-execution processing of a user program is performed, not in the programmable controller, but in the simulation unit 31 and that a value of device data obtained through the execution of the user program by the simulation unit 31 represents second trace data.

In the third embodiment, the reproduction of the occurrence of an abnormality and the verification of the operation of a user program at the occurrence of the abnormality are executed in the simulation unit 31 provided in the peripheral device. This produces an effect of enabling reproduction of the occurrence of an abnormality and verification of a user program at the occurrence of the abnormality on the peripheral device 20 to be performed without using the programmable controller itself. The user program re-execution processing of the simulation unit 31 according to the third embodiment is effective for the verification of only arithmetic processing (the investigation of logic of a user program).

Fourth Embodiment

In the third embodiment, the simulation unit executes a user program. However, it is impossible to receive signals input from the outside, for example, a signal indicative of the device state of an input device. Hence, arithmetic processing with a signal input from the outside cannot be performed. In a fourth embodiment, a peripheral device which can perform calculation with a signal input from the outside in the simulation processing will be described.

Figure 12:
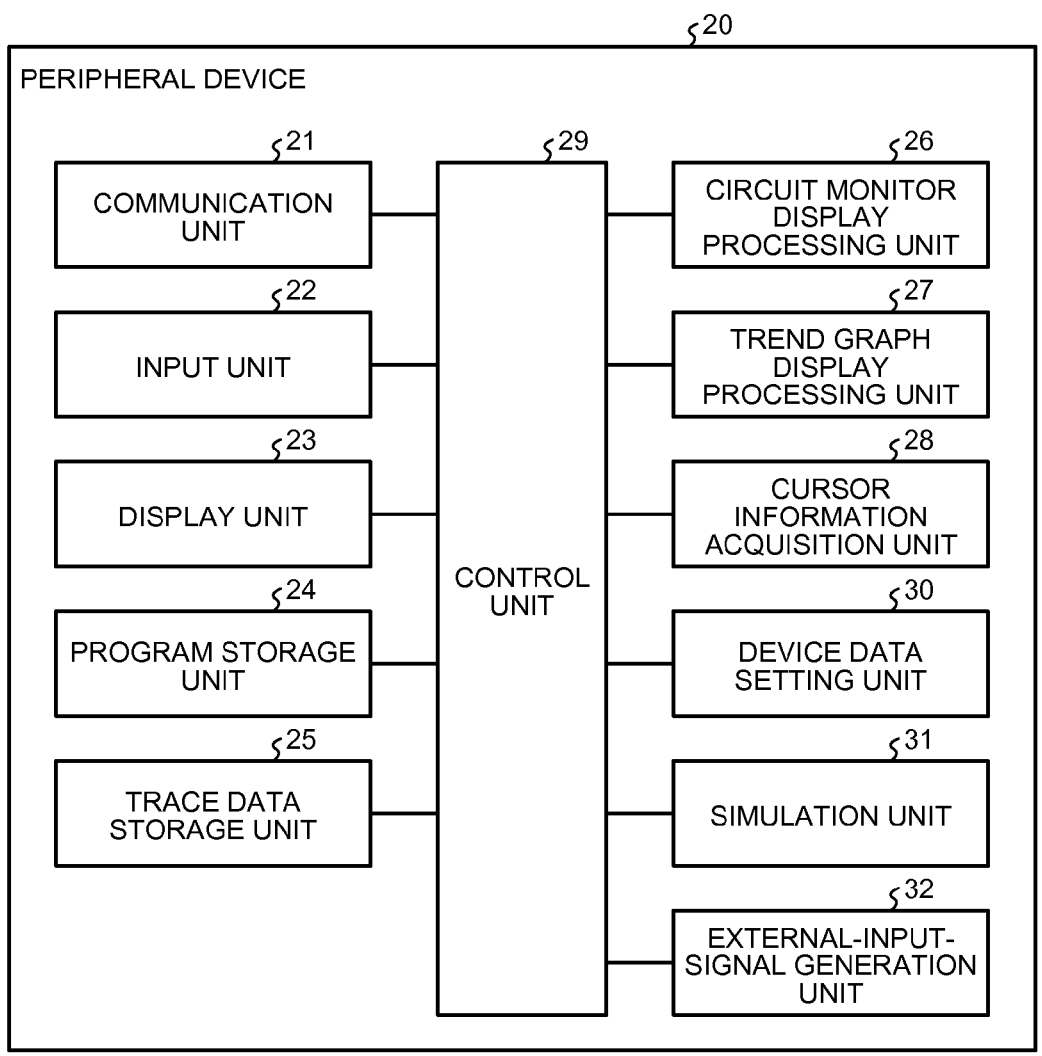
FIG. 12 is a schematic block diagram illustrating an exemplary functional configuration of a peripheral device according to a fourth embodiment.

FIG. 12 is a schematic block diagram illustrating an exemplary functional configuration of a peripheral device according to the fourth embodiment. The peripheral device 20 further includes an external-input-signal generation unit 32, which is an external-input-signal generation unit, in addition to the components of the third embodiment. The external-input-signal generation unit 32 acquires trace data for simulation from the trace data storage unit 25 and extracts, from the trace data, a signal input from the outside to generate a timing chart of an external input signal. Device data for use in a programmable controller includes, in general, a signal input from the outside, a signal output to the outside, and word data, which each have a distinctive variable name. For example, a variable "X" is assigned to a signal input from the outside, to which an index is given to make a distinction between signals (device data). Additionally, a variable "Y" is assigned to a signal output to the outside, to which an index is given to make a distinction between signals (device data). Furthermore, a variable "D" is assigned to the word data, to which an index is given to make a distinction between signals (device data). This enables the external-input-signal generation unit 32 to generate an external input signal by acquiring, from the trace data, a device data column having a variable "X" and starting at a reproduction start point designated by the user.

Figure 13A:
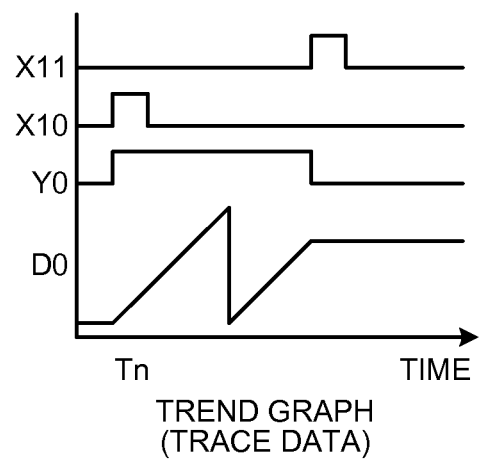
FIGS. 13(a) and 13(b) are diagrams illustrating an example generation procedure of an external input signal.
Figure 13B:
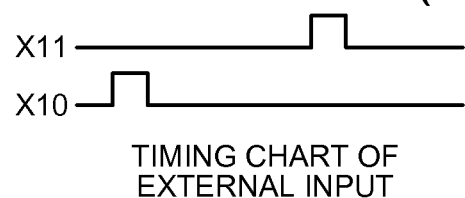

FIG. 13 is a diagram illustrating an example generation procedure of an external input signal. As illustrated in FIG. 13(a), trace data includes signals X10 and X11 input from the outside, a signal Y0 output to the outside, word data D0, and the like. By extracting, from this trace data, pieces of the trace data for X10 and X11, which are signals input from the outside, external input signals illustrated in FIG. 13(b) can be generated.

Upon receiving an instruction to execute the simulation processing, the simulation unit 31 performs the simulation processing by using the device data set in the device data setting unit 30 and a timing chart of an external input signal generated by the external-input-signal generation unit 32. Note that components identical with those in the first to third embodiments are designated with identical reference signs and their description is omitted.

The operation in the fourth embodiment is substantially similar to the second embodiment and its description is omitted. Note that the fourth embodiment is different from the second embodiment in that the simulation unit 31 acquires an external input signal on the basis of a timing chart of the external input signal generated in the external-input-signal generation unit 32 and then performs the re-execution processing of a user program by using device data set in the device data setting unit 30.

Figure 14A:
FIGS. 14(a) and 14(b) are diagrams illustrating an example of an external input signal when chattering is added thereto.
Figure 14B:

The external-input-signal generation unit 32 may acquire, from past trace data, only a signal input from the outside designated through the input unit 22 by the user to generate a timing chart of the external input signal. The external-input-signal generation unit 32 may arbitrarily edit a timing chart of the acquired external input signal according to an instruction from the input unit 22 by the user. This allows the verification of an operation to be performed with the sequence of input signals changed or with chattering caused in the external input signal. FIG. 14 is a diagram illustrating an example of an external input signal when chattering is added thereto. FIG. 14(a) represents data acquired from trace data and FIG. 14(b) represents the data in FIG. 14(a) with chattering added thereto. The execution of the simulation processing by the simulation unit 31 with a signal edited to have chattering in such a manner enables verification of whether a programmable controller performs a desired operation even with chattering.

In the third embodiment, the simulation unit 31, which operates on the peripheral device 20, cannot acquire a signal input from the outside at the occurrence of an abnormality in a programmable controller; thus, the user program may not exhibit an operation identical with that at the occurrence of the abnormality. In contrast, the fourth embodiment uses a history, kept in trace data, of a signal input from the outside at the actual occurrence of an abnormality in a programmable controller. A timing chart of the external input signal is generated from the trace data such that the timing chart includes the signal that has been input from the outside at the occurrence of the abnormality of the programmable controller and its timing. This produces an effect of enabling the simulation unit 31 to reproduce the state of the programmable controller at the occurrence of an abnormality.

Additionally, by enabling a timing chart of an external input signal generated from trace data to be abnormality edited or a timing chart of a totally new external input signal to be generated, a phenomenon that is not easily produced in an actual device can be produced easily on the simulation unit 31. As a result, an effect is obtained where an investigation of the causes at the occurrence of an abnormality can be performed efficiently.

Note that the debug support method in the peripheral device for a programmable controller described above can be configured as a program having stored the processing procedure of the method. The program can then be executed in the peripheral device 20 described above to achieve the debug support method. Additionally, the program is recorded in a computer-readable recording medium, such as a hard disk, an SSD (Solid State Drive), a Floppy® disk, a CD (Compact Disk)-ROM (Read Only Memory), an MO (Magneto-Optical disk), and a DVD (Digital Versatile Disk or Digital Video Disk). In such a case, the program is read by the peripheral device 20 from the recording medium. The program may be distributed through a network (communication line), such as the internet.

INDUSTRIAL APPLICABILITY

As described above, the peripheral device for a programmable controller according to the present invention is useful in error analysis of a user program for the programmable controller.

REFERENCE SIGNS LIST 10 programmable controller, 11, 21 communication unit, 12 program execution unit, 13, 24 program storage unit, 14 calculation unit, 15 device data memory unit, 16 trace data acquisition unit, 17, 25 trace data storage unit, 18, 29 control unit, 20 peripheral device, 22 input unit, 23 display unit, 26 circuit monitor display processing unit, 27 trend graph display processing unit, 28 cursor information acquisition unit, 30 device data setting unit, 31 simulation unit, 32 external-input-signal generation unit, 50 network, 100 display screen, 110 circuit monitor display area, 120 trend graph display area, 121 cursor.

The invention claimed is:

1. A peripheral device for a programmable controller, comprising:
   a display unit;
   a program storage unit that stores a user program to be executed in the programmable controller;
   a history information storage unit that stores history information that is arithmetic processing information during execution of the user program in the programmable controller and recorded under a set condition, the arithmetic processing information including an external input signal, an external output signal, and word data of the programmable controller, the external input signal, the external output signal, and the word data being distinguished by variable names;
   a program display processing unit that displays a designated user program in a user program display area provided in the display unit;
   a trend graph display processing unit that displays a first trend graph and a cursor in a trend graph display area provided separately from the user program display area in the display unit, the first trend graph being obtained by graphing first history information that corresponds to the designated user program, the cursor indicating a position on the first trend graph;
   a cursor information acquisition unit that acquires a position of the cursor on the first trend graph and acquires arithmetic processing information corresponding to the position of the cursor from the first history information;
   a simulation unit that simulates operation processing when the user program is executed on the programmable controller;
   a parameter setting unit that sets, as a parameter for executing the user program in the simulation unit, arithmetic processing information at a designated position of the cursor designated on the first trend graph, in the simulation unit; and
   an external-input-signal generation unit that acquires a data column of the external input signal from the first history information stored in the history information storage unit and generates a timing chart of the external input signal, the data column having a variable given to the external input signal and starting at the designated position,
   wherein the program display processing unit displays the arithmetic processing information acquired from the cursor information acquisition unit over the user program in the user program display area,
   the simulation unit performs the simulation processing of execution of the user program in the programmable controller by using the parameter and the timing chart of the external input signal,
   the program display processing unit and the trend graph display processing unit simultaneously display the designated user program, the first trend graph, and the cursor,
   the user program is a sequence program written in a relay symbolic language with an operand associated with an address range in a device data memory unit of the programmable controller, and
   the arithmetic processing information represents a value stored at a set timing at an address associated with the operand in the device data memory unit.

2. The peripheral device for a programmable controller according to claim 1, wherein the simulation unit further has a function to store, in the history information storage unit, arithmetic processing information obtained as a result of the simulation processing as second history information collected under a set condition, and the trend graph display processing unit further has a function to extract a difference between the first history information and the second history information, to display a second trend graph over the first trend graph from the designated position in the trend graph display area, and to display the difference in a manner different from the first trend graph, the second trend graph being obtained by graphing the second history information.

3. The peripheral device for a programmable controller according to claim 1, further comprising an editing unit that edits the timing chart of the external input signal.

4. The peripheral device for a programmable controller according to claim 1, wherein
   the program display processing unit displays the arithmetic processing information corresponding to the position of the cursor over or in proximity to a corresponding operand in the user program in the user program display area.

5. A non-transitory computer-readable recording medium storing a debug support program which, when executed, causes a computer to execute:
   a program displaying step of displaying a user program executed in a programmable controller, in a user program display area in a display unit;
   a first-history-information reading step of reading first history information that is arithmetic processing information during execution of the user program in the programmable controller and recorded under a set condition;
   a first-trend-graph display processing step of displaying a first trend graph and a cursor in a trend graph display area that is separate from the user program display area in the display unit, the first trend graph being obtained by graphing the first history information, the cursor designating a position on the first trend graph;
   a cursor position acquisition step of acquiring a position of the cursor on the first trend graph;
   a cursor designation information acquisition step of acquiring cursor designation information from the first history information, the cursor designation information being arithmetic processing information corresponding to the position of the cursor;
   a cursor designation information display processing step of displaying the acquired cursor designation information over the user program in the user program display area;
   an external-input-signal generation step of acquiring a data column of the external input signal from the first history information and generating a timing chart of the external input signal, the data column having a variable given to the external input signal and starting at a designated position designated by the cursor on the first trend graph; and
   a simulation step of simulating operation processing when the user program is executed on the programmable controller by using arithmetic processing information at the designated position and the timing chart of the external input signal,
   wherein the program displaying step and the first-trend-graph display processing step are performed simultaneously so that the designated user program, the first trend graph, and the cursor are displayed simultaneously,
   the user program is a sequence program written in a relay symbolic language with an operand associated with an address range in a device data memory unit of the programmable controller, and the arithmetic processing information represents a value stored at a set timing at an address associated with the operand in the device data memory unit.

6. The non-transitory computer-readable recording medium according to claim 5, which, when the stored debug support program is executed, further causes the computer to execute:

a second-history-information acquisition step of acquiring second history information that is arithmetic processing information obtained through the simulation and recorded under a set condition;

a difference extracting step of extracting a difference between the first history information and the second history information; and a second-trend-graph display processing step of displaying a second trend graph over the first trend graph from the designated position in the trend graph display area and displaying the difference in a manner different from the first trend graph, the second trend graph being obtained by graphing the second history information.

* * * * *